Jan. 15, 1935.  C. J. DUNZWEILER  1,988,111
STORAGE BATTERY
Filed Feb. 6, 1928  5 Sheets-Sheet 1
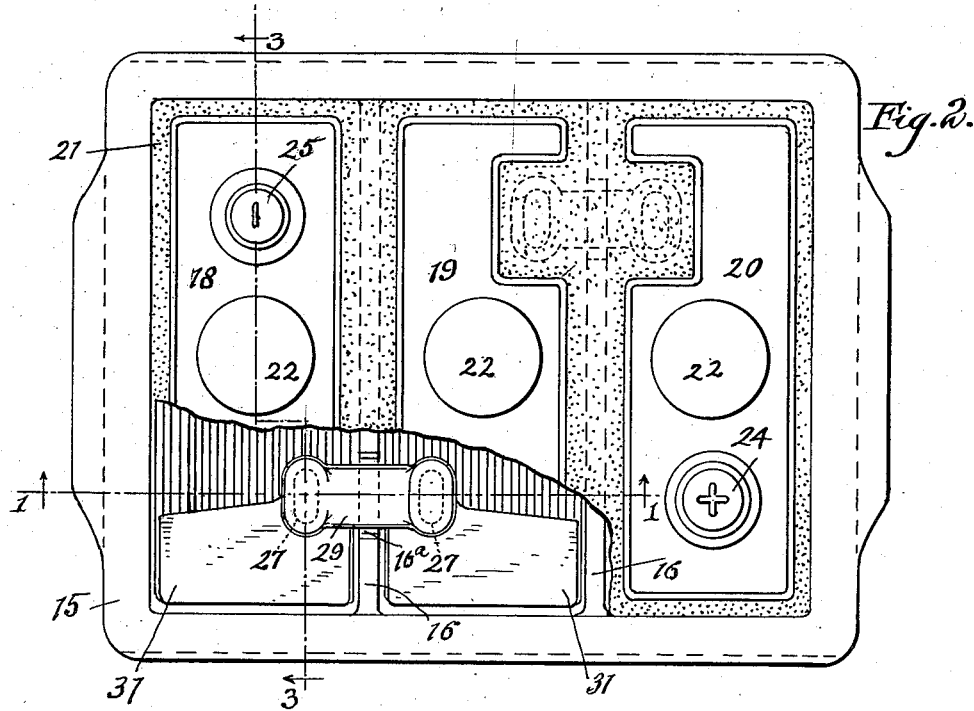
Fig. 2.
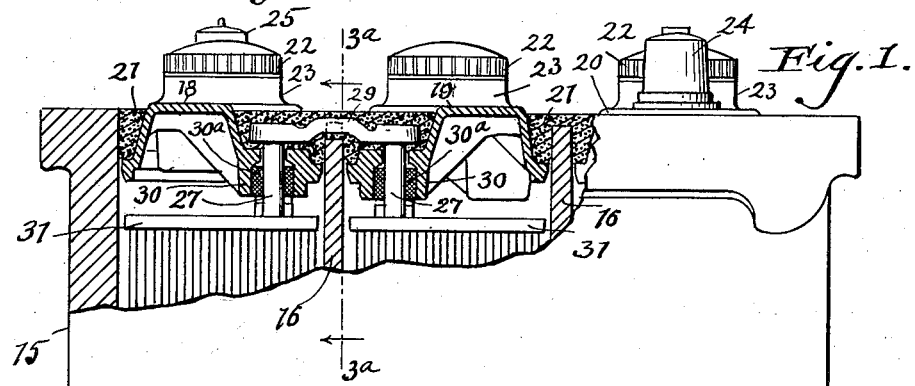
Fig. 1.
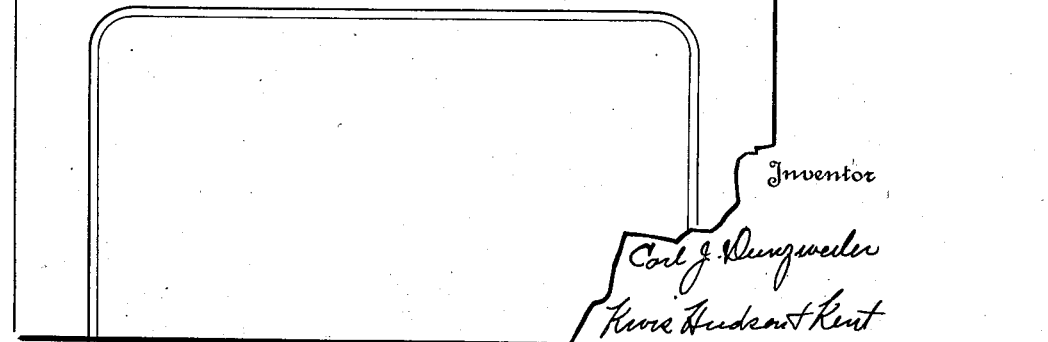
Inventor
Carl J. Dunzweiler
Kerr Hudson & Kent
Attorneys

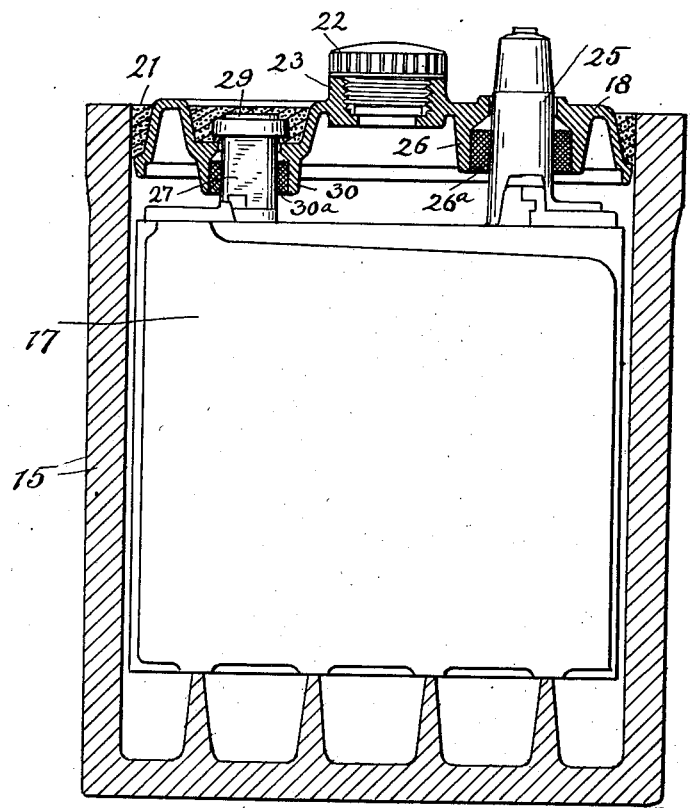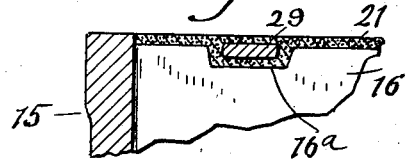

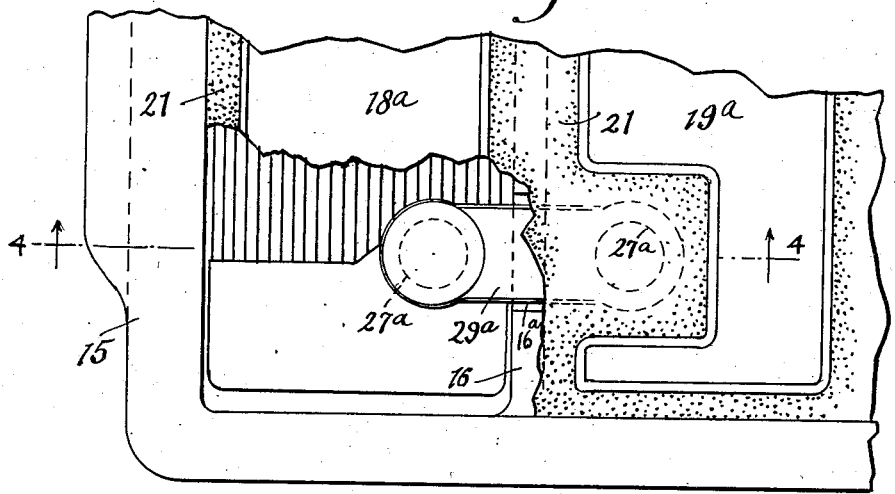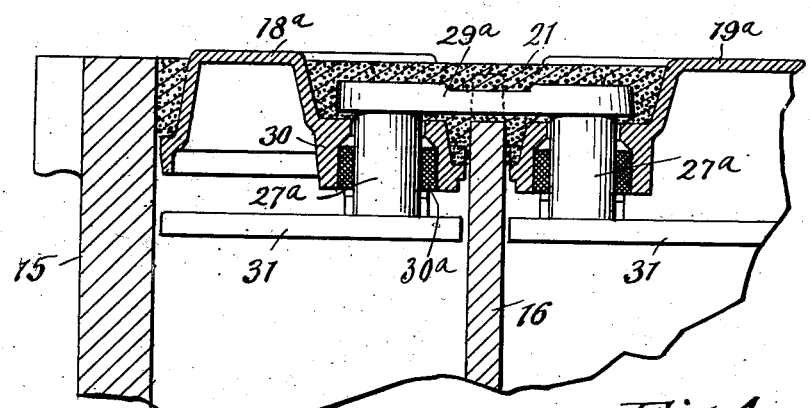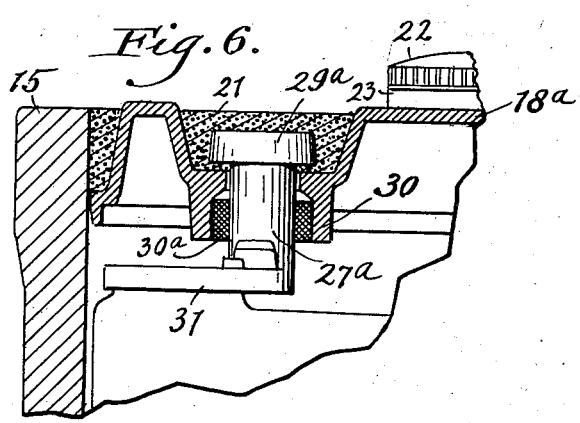

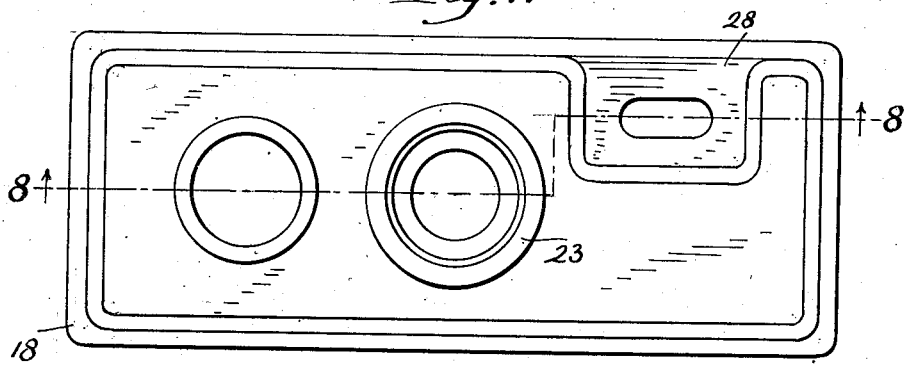
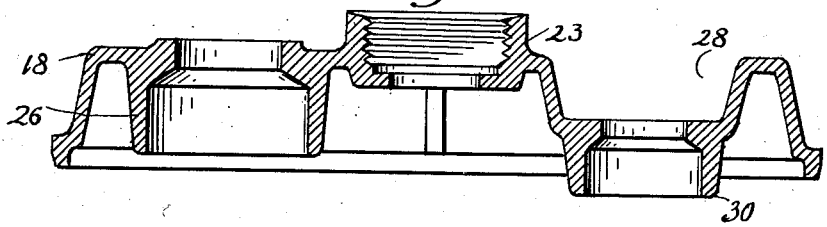
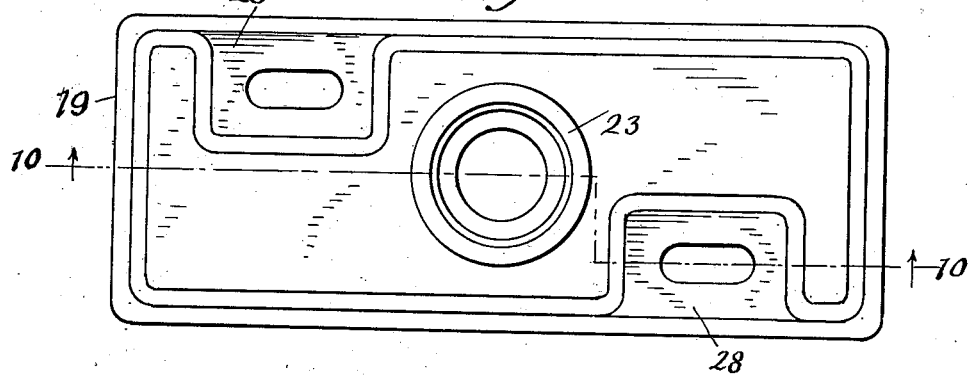
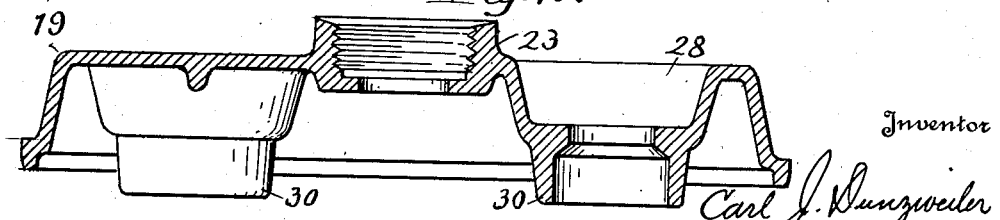

Jan. 15, 1935.  C. J. DUNZWEILER  1,988,111
STORAGE BATTERY
Filed Feb. 6, 1928  5 Sheets-Sheet 5

Inventor
Carl J. Dunzweiler
By Kivis Hudson & Kent
Attorneys

Patented Jan. 15, 1935

1,988,111

UNITED STATES PATENT OFFICE 1,988,111

STORAGE BATTERY

Carl J. Dunzweiler, Cleveland, Ohio, assignor to Willard Storage Battery Company, Cleveland, Ohio, a corporation of West Virginia Application February 6, 1928, Serial No. 252,085

4 Claims. (Cl. 136—134)

This invention relates to storage batteries, and has for its chief object to reduce the cost of batteries by effecting a saving in lead. More particularly, the invention aims to reduce the amount of lead required in the inter-cell connections.

A further object is to improve the appearance and construction at the top of the battery by providing a construction wherein only the posts forming the two main positive and negative terminals of the battery project through and are visible at the top of the battery, the inter-cell connections including posts and straps being embedded in compound at the top of the battery and, therefore, concealed from view.

The above objects are attained by several novel features, among which is the fact that though the inter-cell connections through the medium of cross connecting straps are made above the cell covers, a very material saving of lead is effected by reason of the fact that the posts to which the straps are connected are shorter, of less cross-section, and nearer the sides of the cells than heretofore, permitting the use of shorter and otherwise smaller cross connecting straps.

In order that these improvements may be made, I employ a novel cover construction, the covers in my new battery having depressed portions where the inter-cell connections are to be made, which depressed portions receive relatively short posts and cross connecting straps. In order that low lying straps may be utilized, the top portions of the partition of the battery case or container are preferably notched out to provide clearance for these straps but these notches are outside of or above the cell compartments.

By the above improvements, complications in making and maintaining the inter-cell connections are entirely eliminated and a battery improved in appearance and also mechanically and electrically is obtained by covering the protruding portions of the posts and the cross connecting straps in the depressions in the cover with sealing compound at the same time that the cell covers are sealed so that when the battery is completed only the posts forming the two main or end terminals are visible.

In the accompanying sheets of drawings, Figure 1 is a side elevation of my improved battery with a portion in section substantially along the line 1—1 of Figure 2.

Figure 2 is a top plan view with a portion of the top of the battery broken away.

Figure 3 is a transverse section, the section being taken substantially along the irregular line 3—3 of Figure 2, looking in the direction indicated by the arrows.

Figure 3a is a fragmentary sectional view substantially along the line 3a—3a of Figure 1.

Figures 4, 5 and 6 are fragmentary views corresponding to Figures 1, 2 and 3, showing a modification in the shape of the posts to which the cross connecting straps are connected.

Figure 7 is a top plan view and

Figure 8 is a longitudinal sectional view, the section of Figure 8 being along the irregular line 8—8 of Figure 7, showing the cell covers employed with the end cells of the construction shown in Figures 1, 2 and 3.

Figure 11:
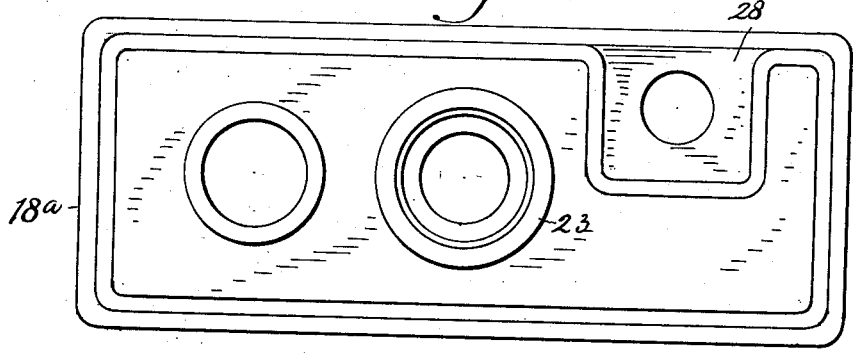
Figure 12:
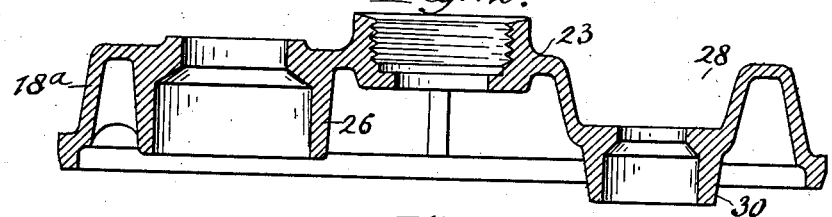
Figure 13:
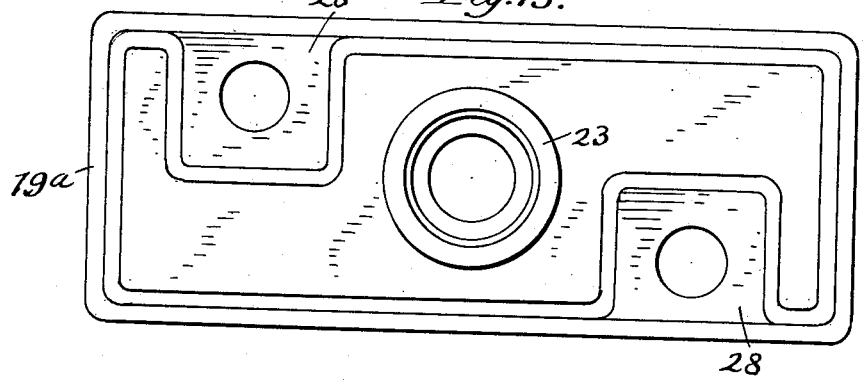
Figure 14:
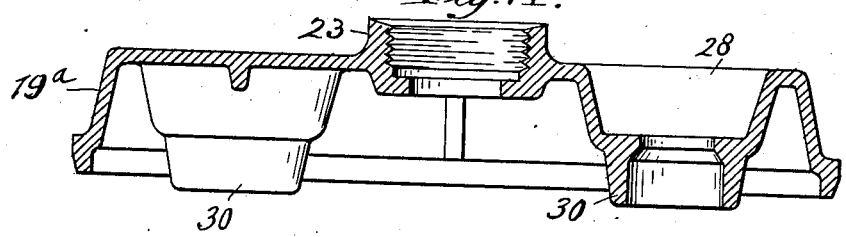

Figures 9 and 10 are, respectively, a top plan view and a section along the irregular line 10—10 of Figure 9, showing the cell cover employed with the middle cell of the construction shown in Figures 1, 2 and 3, and Figures 11, 12, 13 and 14 are figures corresponding to Figures 7, 8, 9 and 10, showing the cell covers employed with the construction illustrated in Figures 4 to 6.

Referring now to the drawings, the battery includes a unitary, multi-compartment battery case or casing 15 having the usual integral dividing partitions 16, the battery illustrated having two such partitions forming three compartments for a three cell battery. The number of compartments and, therefore, cells may be less or greater than three, the number of cells being immaterial as long as there is more than one cell. The case 15 may be molded in one piece from rubber composition, bituminous composition, or any other suitable insulating, acid-resistant material.

Each cell contains the usual battery element composed of a group of positive plates, a group of negative plates, and any of the usual insulators or separators between them, the battery element as a whole being designated by the reference character 17.

The top or cover of the battery is formed in this instance by three separate cell covers, which in the construction shown in Figures 1 to 3, are designated 18, 19 and 20, the covers 18 and 20 being duplicates or substantial duplicates of each other, but the cover 19 for the middle cell differs therefrom in construction, as will be explained. As usual, the covers have marginal depending skirts which fit well down into the cell compartments and they are sealed in place by sealing compound, indicated at 21. In this instance the sealing compound not only seals the covers in place but also conceals and embeds the cross connecting straps and the ends of the posts to which they are attached, as will be explained, so as to form a much smoother battery top with an exposure of a less number of live parts than heretofore.

Each cell cover has a filling plug 22, which is preferably screwed into an upstanding, internally threaded sleeve-like projection 23 of the cover, and, additionally, the covers for the end cells have provisions for receiving one the positive terminal or post 24 and the other the negative terminal or post 25 which project up above the end cell covers as indicated in the drawings. The posts 24 and 25 project up through flange-like sleeves 26 formed on the under sides of the covers, see Figs. 3, 8 and 12, and these terminal posts as well as the posts for the inter-cell connections are preferably sealed in the covers by being tightly fitted into rubber bushings 26ª received in the sleeves substantially in accordance with U. S. Patent No. 1,600,442, granted September 21, 1926, in the name of Theodore A. Willard.

It is to be noted that the main positive and negative posts 24 and 25 are of the usual construction and location, and they are likewise preferably of usual size and shape so as to receive standard connectors which are adapted to be clamped or otherwise secured to the upper ends of the posts.

In forming the inter-cell connections, I deviate very materially from standard practice in the location, size, shape and height of the posts and straps by which the inter-cell connections are made. The posts which are adapted to receive the inter-cell or cross connecting straps are made smaller in cross section and considerably shorter than heretofore and are located off the center lines of the covers and are brought through the latter close to the sides of the covers. In Fig. 1, 2 and 3 these posts, which are designated 27, are made rectangular in shape, but they may be round, as shown at 27ª in Figs. 4, 5 and 6. The rectangular shape illustrated in Figs. 1, 2 and 3 has a certain advantage over the round, especially as it effects a slightly greater saving in lead, but either shape may be employed.

In order that the advantages heretofore enumerated may be attained, the posts 27 or 27ª extend up through openings in depressed portions 28 of the covers, which depressed portions extend inwardly to the sides of the covers and are of sufficient depth to receive the cross connecting straps 29 which are shorter and otherwise smaller than in standard batteries. The rectangular posts 27 or the round posts 27ª of Figs. 4, 5 and 6 are preferably sealed in rubber sleeves 30ª like the main terminal posts 24 and 25, the sleeves being fitted into sleeve-like extensions 30 which are on the lower sides of the covers like the extensions 26 but are much lower than the latter, as will be seen by reference to the detail views of the cell covers. It will be seen that the covers 18 and 20 for the two end cells each have one of these laterally extending depressions 28, whereas the cover 19 for the middle cell has two such depressions arranged toward opposite ends of the cover and extending toward opposite sides so that they will register with the corresponding depressions of the end cell covers.

The covers shown in Figs. 4, 5, 6, 11, 12, 13 and 14 (designated 18ª and 19ª) differ from those shown in Figs. 1, 2, 3, 7, 8, 9 and 10 simply in the fact that in the latter the openings for the posts 27 are rectangular and the sealing flanges 30 on the under sides of the covers are rectangular in shape, whereas in Figs. 1 to 3 and 11 to 14 the openings for the posts 27ª are round and the sealing flanges on the under sides of the covers are correspondingly shaped. Of course the rubber sealing bushings 26ª for the rectangular posts are rectangular when in place and the rubber bushings 30ª for the round posts are round.

It will be observed that the cross connecting straps which as usual are lead-burned to the upper ends of the posts 27 or 27ª are wholly below the top surface of the container 15 and to make this possible the partitions 16 are notched out at the top as shown at 16ª to accommodate the straps since the partitions extend upwardly to nearly the top of the container body. The cross connecting straps which are attached to the rectangular posts 27, shown in Figs. 1 to 3, are designated 29, and the straps which are attached to the round posts 27ª are designated 29ª.

Since the posts which receive the cross connecting straps extend up through the covers, the straps can be lead-burned to the tops of these posts in the usual manner and just as effective electrical and mechanical connections can be made as with standard batteries.

After the straps are lead-burned to the posts, the sealing compound 21 is poured onto the top of the battery to seal each cover around its margin and to fill the depressions 28 of the cover and embed the cross connecting straps and tops of the posts to which they are connected so that the latter will be completely concealed and a battery will be provided whose top or cover is smooth compared with standard batteries.

Thus it will be seen that by decreasing the size of the post 27 or 27ª and by bringing the posts inwardly toward each other, thus permitting the use of short and otherwise relatively small straps a considerable saving in lead is effected. It will be understood that these posts and straps nevertheless have ample current carrying capacity. It might be mentioned at this point that the posts 27 and 27ª project upwardly from special straps 31 which are lead-burned to lugs on the battery plates in the usual manner. Additionally, since the cross connecting straps and the posts to which they are attached are concealed from view beneath the top surfaces of the cell covers and the top surface of the battery cover as a whole, the battery has a better appearance and there is less liability of injury to the parts which make the inter-cell connections and less liability of accidental short circuiting than heretofore.

While I have shown two slightly different forms of the present invention, other changes may be made, and I therefore aim to cover all such changes and modifications which do not involve a departure from the spirit and scope of the invention as defined by the appended claims.

Having thus described my invention, I claim:

1. In a storage battery the combination of a container having a partition dividing the interior thereof into cells, upwardly dished individual covers for the cells, said covers having corresponding depressed portions at the adjacent sides of the covers and which are on opposite sides of the partition, said depressed cover portions having openings therethrough which are formed to lie wholly inwardly of the adjacent edges of the depressed portions, plate groups in the cells having posts extending upwardly through said openings, plastic material in the recess formed by the depressed cover portions, and an inter-cell connecting strap crossing said partition and wholly embedded in the plastic material with its ends connected to said posts.

2. In a storage battery the combination of a container having a partition dividing the interior thereof into cells, upwardly dished individual covers for the cells, said covers having corresponding depressed portions at the adjacent sides of the covers and which are on opposite sides of the partition, said depressed cover portions having openings therethrough which are formed to lie wholly inwardly of the adjacent edges of the depressed portions, plate groups in the cells having posts extending upwardly through said openings, plastic material in the recess formed by the depressed cover portions, an inter-cell connecting strap crossing said partition and wholly embedded in the plastic material with its ends connected to said posts, and means in said openings for sealing the terminal posts therein.

3. In a storage battery the combination of a container having a partition dividing the interior thereof into cells, upwardly dished individual covers for the cells, said covers having corresponding depressed portions at the adjacent sides of the covers and which are on opposite sides of the partition, said depressed cover portions having openings therethrough which are formed to lie wholly inwardly of the adjacent edges of the depressed portions, plate groups in the cells having posts extending upwardly through said openings, plastic material in the recess formed by the depressed cover portions, an inter-cell connecting strap crossing said partition and wholly embedded in the plastic material with its ends connected to said posts, said depressed cover portions also having integral sleeves depending from the underside thereof around said openings, and means in said sleeves forming a seal around said posts.

4. In a storage battery the combination of a container having a partition dividing the interior thereof into cells, upwardly dished individual covers for the cells having openings in the tops thereof, said covers also having corresponding depressed portions at the adjacent sides of the covers and which are on opposite sides of the partition, said depressed cover portions having openings therethrough which are formed to lie wholly inwardly of the adjacent edges of the depressed portions, plate groups in the cells having main posts extending upwardly through the first mentioned openings and auxiliary posts extending upwardly through the second mentioned openings, plastic material in the recess formed by the depressed cover portions, an inter-cell conductor crossing said partition and wholly embedded in the plastic material with its ends connected to said auxiliary posts, said covers also having integral sleeves depending from the underside thereof around said openings, and means in said sleeves forming seals around the main and auxiliary posts.

CARL J. DUNZWEILER.